United States Patent
Nishida et al.

(10) Patent No.: US 12,485,497 B2
(45) Date of Patent: Dec. 2, 2025

(54) ARC-TRACKING WELDING METHOD AND WELDING DEVICE

(71) Applicant: KOBE STEEL, LTD., Hyogo (JP)

(72) Inventors: Yoshiharu Nishida, Kobe (JP); Tsutomu One, Kobe (JP); Tatsuya Fujii, Kobe (JP)

(73) Assignee: KOBE STEEL, LTD., Hyogo (JP)

( * ) Notice: Subject to any disclaimer, the term of this patent is extended or adjusted under 35 U.S.C. 154(b) by 1035 days.

(21) Appl. No.: 17/478,544

(22) Filed: Sep. 17, 2021

(65) Prior Publication Data

US 2022/0111462 A1 Apr. 14, 2022

(30) Foreign Application Priority Data

Oct. 12, 2020 (JP) .................................. 2020-171920

(51) Int. Cl.
 *B23K 9/127* (2006.01)
 *B23K 9/095* (2006.01)
 *B23K 37/02* (2006.01)

(52) U.S. Cl.
 CPC ............ *B23K 9/127* (2013.01); *B23K 9/0953* (2013.01); *B23K 37/0252* (2013.01)

(58) Field of Classification Search
 CPC .. B23K 9/127; B23K 9/0953; B23K 37/0252; B23K 9/0216; B23K 9/09; B23K 9/095; B23K 9/29
 See application file for complete search history.

(56) References Cited

U.S. PATENT DOCUMENTS

| 2009/0107969 A1* | 4/2009 | Asai ..................... B23K 9/0216 |
| | | 219/124.1 |
| 2016/0288236 A1* | 10/2016 | Becker ................ B23K 9/0956 |
| 2020/0198041 A1 | 6/2020 | Nishida et al. |

FOREIGN PATENT DOCUMENTS

| EP | 3 539 707 A1 | 9/2019 | |
| EP | 3 542 944 A1 | 9/2019 | |
| JP | 59185572 A | * 10/1984 | ........... B23K 9/0216 |
| JP | S59-185572 A | 10/1984 | |
| JP | 2004098162 A | * 4/2004 | |

(Continued)

OTHER PUBLICATIONS

The extended European search report issued by the European Patent Office on Mar. 4, 2022, which corresponds to European Patent Application No. 21197443.1-1016 and is related to U.S. Appl. No. 17/478,544.

(Continued)

*Primary Examiner* — Tiffany T Tran
(74) *Attorney, Agent, or Firm* — Studebaker Brackett PLLC

(57) ABSTRACT

In an arc-tracking welding method and a welding device of the present invention, a deviation amount between a weaving center and a welding line is obtained based on a first relationship and a second relationship. The first relationship is a relationship between a weaving position and any one element of three electrical first to third elements related to Ohm's law, the relationship being obtained based on a physical model of an arc welding phenomenon and being associated with the deviation amount. The second relationship is a relationship between the weaving position and the element, the relationship being obtained based on the element in welding power.

5 Claims, 10 Drawing Sheets

(56) References Cited

FOREIGN PATENT DOCUMENTS

| | | | | |
|---|---|---|---|---|
| JP | 2017185513 A | * | 10/2017 | ........... B23K 9/0216 |
| JP | 2018-083229 A | | 5/2018 | |

OTHER PUBLICATIONS

An Office Action; "Notice of Reasons for Refusal," mailed by the Japanese Patent Office on Aug. 22, 2023, which corresponds to Japanese Patent Application No. 2020-171920 and is related to U.S. Appl. No. 17/478,544; with English language translation.

* cited by examiner

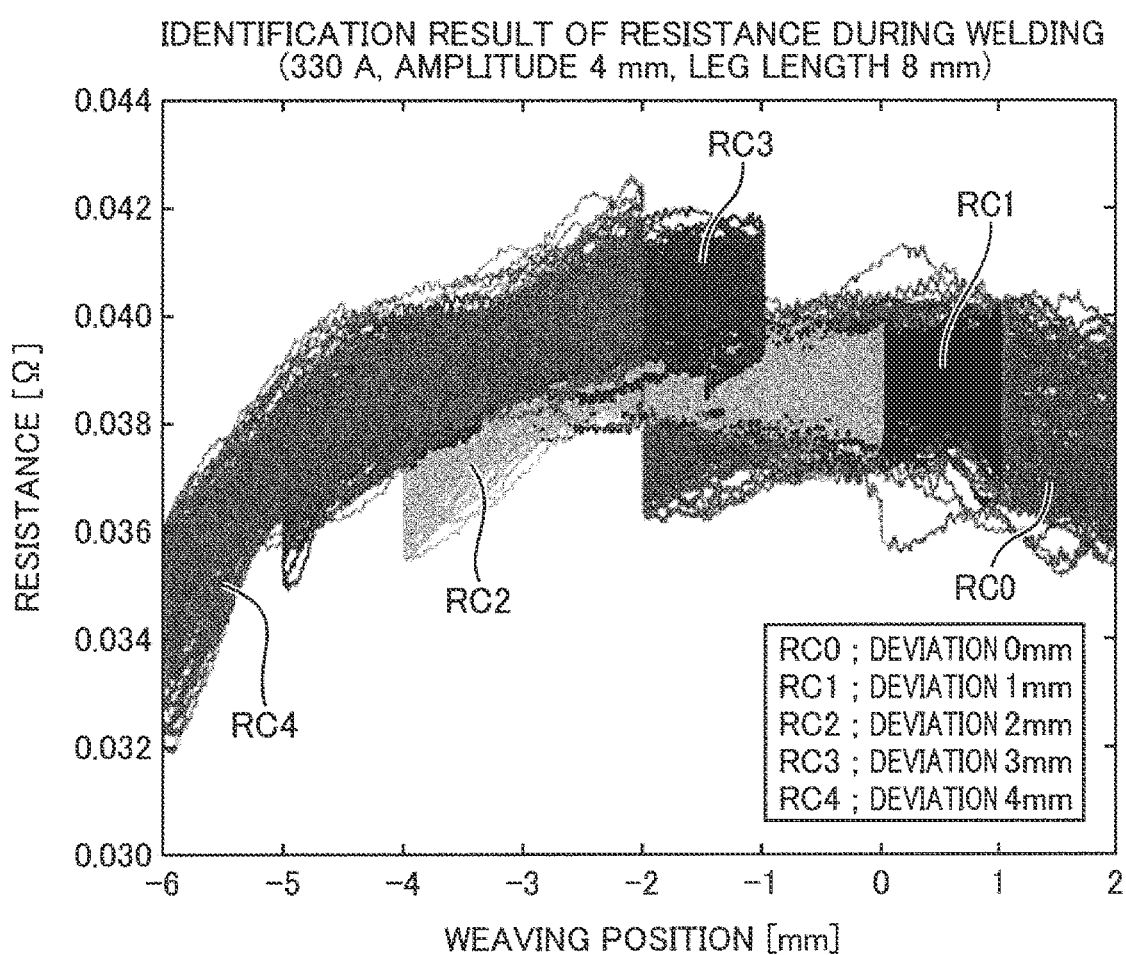

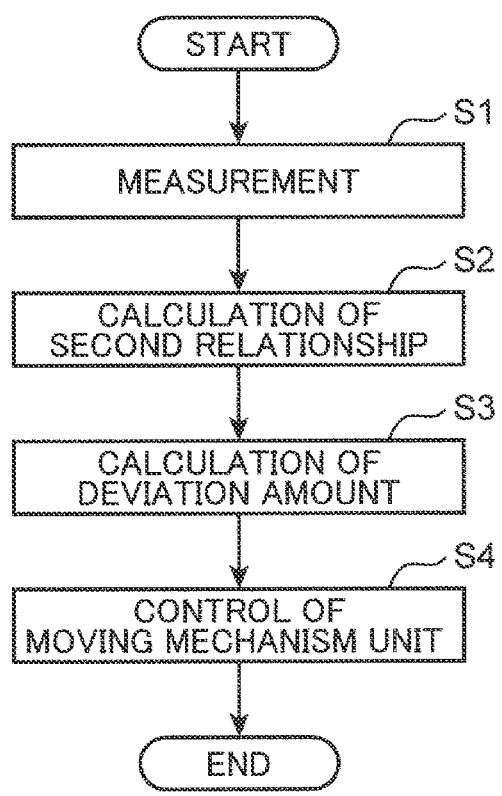

ARC-TRACKING WELDING METHOD AND WELDING DEVICE

TECHNICAL FIELD

The present invention relates to an arc-tracking welding method and a welding device that automatically perform arc welding along a welding line.

BACKGROUND ART

Regarding arc welding, an arc-tracking welding method for performing arc welding while automatically tracking a welding line has been studied and developed in recent years. In the arc-tracking welding, a welding current (or a welding voltage) changes with a change in a projection length of a welding wire, so that a welding current waveform (or a welding voltage waveform) becomes asymmetric during weaving operation when a joint position (a position of a welding line) deviates from a distal end position of the welding wire. Therefore, an amount of the deviation (deviation amount) is obtained from the asymmetry, and the distal end of the welding wire is controlled such that the deviation amount disappears. Such an arc-tracking welding method is disclosed in, for example, Japanese Patent No. 6720452 (JP 2017-185513 A, D1).

The arc-tracking welding method disclosed in D1 is an arc-tracking welding method in a consumable electrode type welding device having a weaving function of swinging a torch in a welding direction, the arc-tracking welding method including: causing a high frequency component to be superimposed on a welding current to be supplied to the consumable electrode; detecting a resistance value change with an electrode height change from the welding current during welding; and detecting a deviation between a weaving center and a welding line based on the detected change amount of the resistance value and left and right positions of the weaving.

As conventional methods, when an amount of deviation from a welding line is detected by a difference in a current value, a resistance value or the like between a left end position and a right end position of weaving, a relationship between the difference and the deviation amount is a monotonically increasing relationship. However, since sensitivity varies with a welding condition and a welding state, when the difference itself is simply used for feedback control, it is difficult to stably perform accurate tracking control.

That is, in order to perform control with high accuracy, it is necessary to increase a feedback gain, while control performance is determined by sensitivity and the feedback gain. While when the sensitivity is low, a feedback gain can be increased, when the sensitivity is high, the feedback gain cannot be increased. For example, in a case where sensitivity changes with a condition, if a feedback gain is increased in accordance with a case where the sensitivity is low, the sensitivity becomes unstable when the sensitivity is high. For this reason, there is no way but determining the feedback gain in accordance with the case where the sensitivity is high, so that the feedback gain cannot be increased, resulting in making it difficult to perform accurate tracking control.

SUMMARY OF INVENTION

The present invention has been made in view of the above circumstances, and an object of the present invention is to provide an arc-tracking welding method and a welding device that enable more accurate tracking control to be realized.

An arc-tracking welding method and a welding device according to the present invention obtain a deviation amount between a weaving center and a welding line based on a first relationship and a second relationship. The first relationship is a relationship between a weaving position and any one element of three electrical first to third elements related to Ohm's law, the relationship being obtained based on a physical model of an arc welding phenomenon and being associated with the deviation amount. The second relationship is a relationship between the weaving position and the element, the relationship being obtained based on the element in welding power.

The above and other objects, features, and advantages of the present invention will become apparent from the following detailed description and the accompanying drawings.

BRIEF DESCRIPTION OF DRAWINGS

FIG. 9 is a diagram showing a welding resistance with respect to a weaving position, the welding resistance being identified by actual measurement; and FIG. 10 is a flowchart showing operation of the welding device.

DESCRIPTION OF EMBODIMENTS

Figure 1:
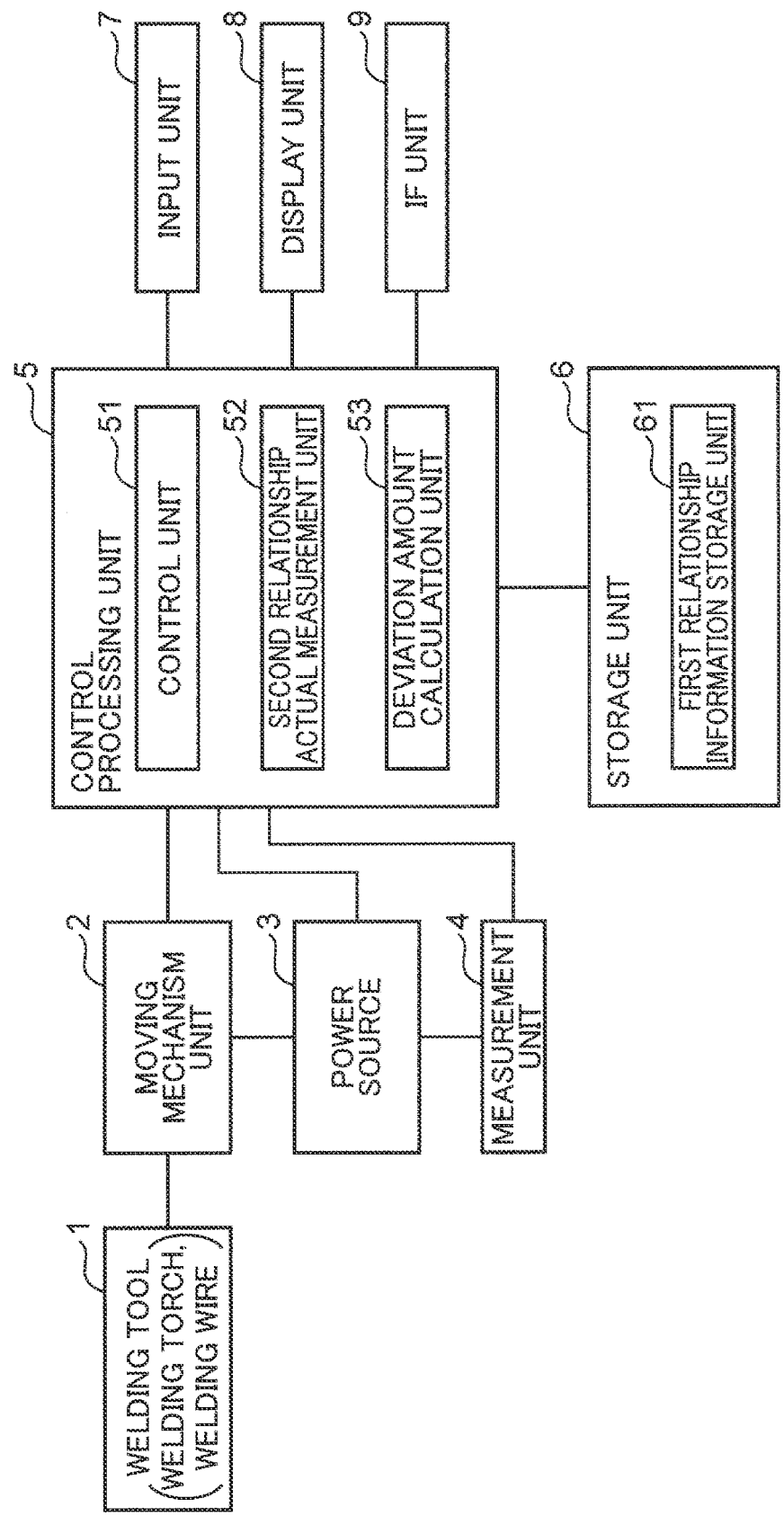
FIG. 1 is a block diagram illustrating a configuration of a welding device according to an embodiment.

Hereinafter, one or more embodiments of the present invention will be described with reference to the drawings. However, the scope of the invention is not limited to the disclosed embodiments. Note that, in the respective drawings, the same reference numerals denote the same configurations, and the description thereof will be appropriately omitted. In the present specification, a generic configuration is indicated by a reference numeral with a suffix omitted, and an individual configuration is indicated by a reference numeral with a suffix.

Figure 2:
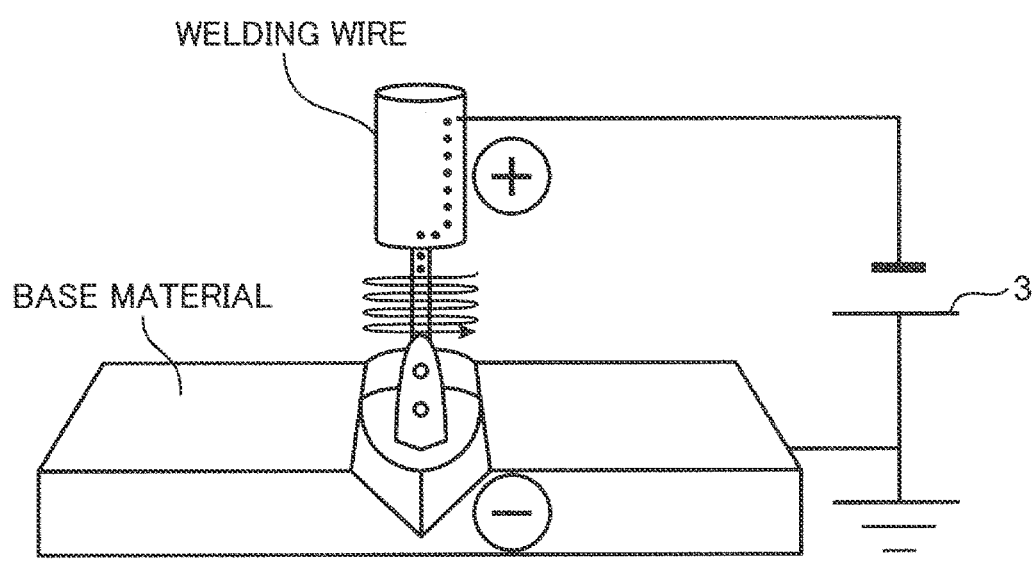
FIG. 2 is a view schematically illustrating arc-tracking welding in the welding device.
Figure 3:
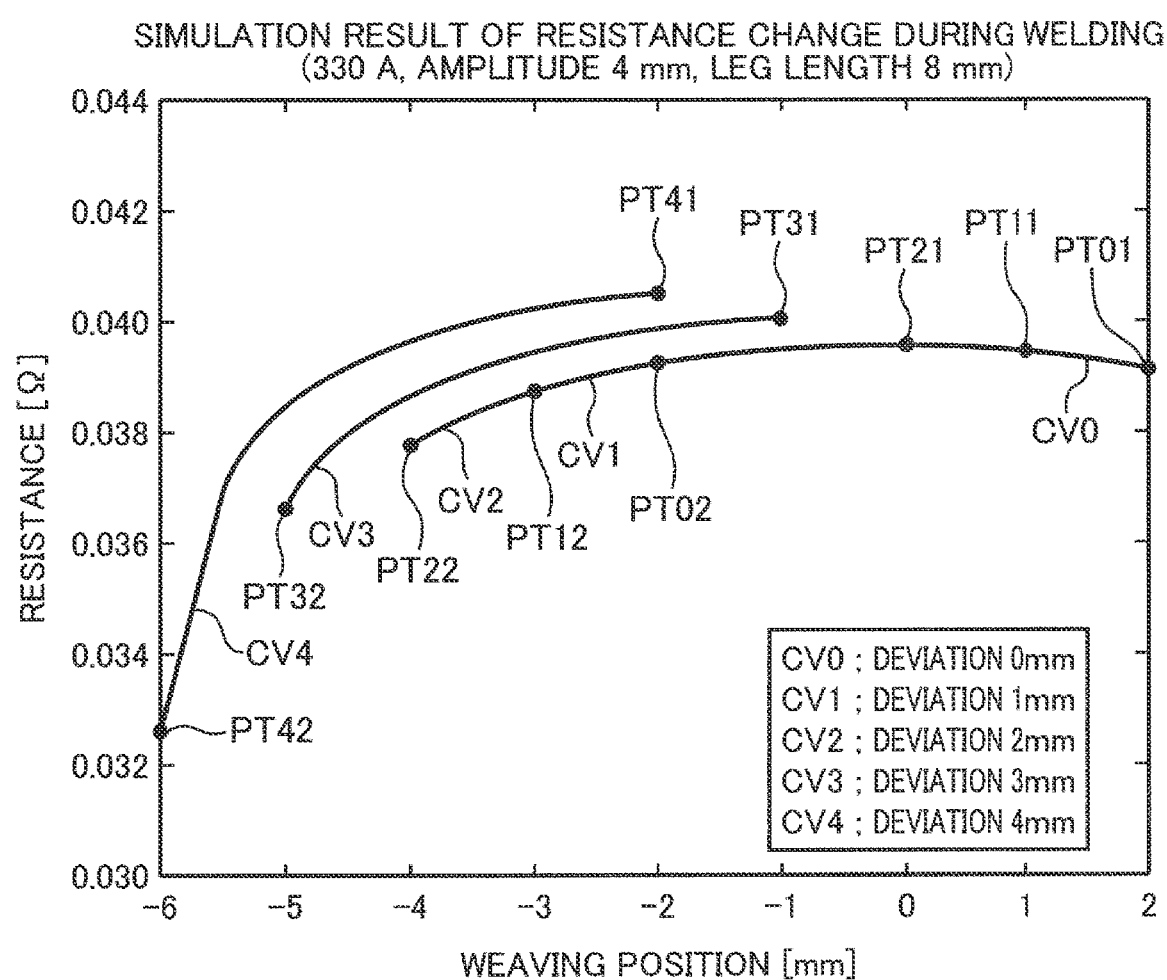
FIG. 3 shows a first relationship as an example.

FIG. 1 is a block diagram illustrating a configuration of a welding device according to an embodiment. FIG. 2 is a view schematically illustrating arc-tracking welding in the welding device. FIG. 3 shows a first relationship as an example. In FIG. 3, the horizontal axis represents weaving position [mm], and the vertical axis represents welding resistance [Ω].

A welding device D according to the embodiment is a consumable electrode type device that has a weaving function of swinging a torch in a direction crossing a welding direction and includes, for example, as illustrated in FIG. 1 and FIG. 2, a welding tool 1, a moving mechanism unit 2, a power source 3, a measurement unit 4, a control processing unit 5, a storage unit 6, an input unit 7, a display unit 8, and an interface unit (IF unit) 9.

The welding tool 1 includes a welding torch, a welding wire, and the like, and is a device for performing welding. The welding wire is an example of a consumable electrode.

The moving mechanism unit 2 is a mechanism that is connected to the control processing unit 5 and moves the welding torch so as to perform arc-tracking welding under the control of the control processing unit 5. The moving mechanism unit 2 includes, for example, a robot arm such as a six-axis articulated robot arm having a plurality of joints, and a robot main body that supports the robot arm, and the welding tool 1 is attached to a distal end of the robot arm. During weaving, the moving mechanism unit 2 swings the welding torch in the welding direction under the control of the control processing unit 5.

The power source 3 is a device that is connected to the control processing unit 5 and applies a voltage between the welding wire supplied from the welding torch in the welding tool 1 and a base material so as to generate an arc between the welding wire and the base material under the control of the control processing unit 5. The power source 3 is connected to each of the welding wire and the base material, and forms a closed circuit by generation of the arc.

The measurement unit 4 is a device that is connected to the control processing unit 5 and measures any one element (welding current, welding voltage, or welding resistance) of three electrical first to third elements related to Ohm's law in welding power to be supplied to the welding wire under the control of the control processing unit 5. In a case where the element is a welding current, the measurement unit 4 measures the welding current. In a case where the element is a welding voltage, the measurement unit 4 measures the welding voltage. In a case where the element is a welding resistance, as disclosed in D1, a high frequency component (for example, a pulse current) having a period shorter than the weaving period is superimposed on a welding current by the power source 3, and the measurement unit 4 measures a welding voltage, the welding current, and the high frequency component. The measurement unit 4 outputs a result of the measurement to the control processing unit 5. Although in D1, the high frequency component is superimposed in order to estimate a resistance value with high accuracy, the measurement unit 4 may measure a low frequency component of the welding voltage or the welding current without superimposing such a high frequency component, and output a voltage value or a current value thereof to the control processing unit 5 as the measurement result.

The input unit 7 is an apparatus that is connected to the control processing unit 5 and inputs, to the welding device D, various commands such as a command for instructing on welding start of the welding device, and various types of data necessary for operating the welding device D such as data (program) for moving the welding torch along the welding line, the apparatus being, for example, a plurality of input switches to which predetermined functions are assigned, a keyboard, a mouse, or the like to which predetermined functions are assigned. The display unit 8 is an apparatus that is connected to the control processing unit 5 and displays commands, data, and the like input from the input unit 7 under the control of the control processing unit 5, the apparatus being, for example, a display device such as a CRT display, a liquid crystal display, or an organic EL display.

The IF unit 9 is a circuit that is connected to the control processing unit 5 and inputs/outputs data to/from an external apparatus under the control of the control processing unit 5, the circuit being, for example, an interface circuit of RS-232C or RS-485 which is a serial communication system, an interface circuit using the Bluetooth (registered trademark) standard, an interface circuit that performs infrared communication such as the Infrared Data Association (IrDA) standard, an interface circuit using the Universal Serial Bus (USB) standard, or the like. The IF unit 9 is a circuit that communicates with an external apparatus, and may be, for example, a data communication card, a communication interface circuit conformed to the IEEE 802.11 standard, or the like.

The storage unit 6 is a circuit that is connected to the control processing unit 5 and stores various predetermined programs and various types of predetermined data under the control of the control processing unit 5. The above-described various predetermined programs include, for example, a control processing program, the control processing program including a control program for controlling each of the units 1 to 4 and 6 to 9 of the welding device D according to a function of each unit; a second relationship actual measurement program for obtaining a second relationship between a weaving position and the element based on the element in the welding power to be supplied to the welding wire, the element being measured by the measurement unit 4; and a deviation amount calculation program for obtaining a deviation amount between a weaving center and a welding line based on a first relationship stored in a first relationship information storage unit 61 to be described later and the second relationship obtained by the second relationship actual measurement program. The control program further controls the moving mechanism unit 2 such that the welding torch performs arc welding along the welding line based on the deviation amount obtained by the deviation amount calculation program. The above-described various types of predetermined data include data necessary for executing the respective programs, such as the first relationship. Such a storage unit 6 includes, for example, a read only memory (ROM) which is a nonvolatile storage element, an electrically erasable programmable read only memory (EEPROM) which is a rewritable nonvolatile storage element, and the like. The storage unit 6 then includes a random access memory (RAM) serving as a working memory of the control processing unit 5, the working memory storing data and the like generated during execution of the predetermined program. The storage unit 6 may include a hard disk device capable of storing large capacity data.

The storage unit 6 functionally includes the first relationship information storage unit 61 that stores the first relationship in association with the deviation amount between the weaving center and the welding line. The first relationship is a relationship between a weaving position and any one element of the three electrical first to third elements related to Ohm's law, the relationship being obtained based on a physical model of an arc welding phenomenon, and is obtained for each of a plurality of deviation amounts between the weaving center and the welding line. The element in the first relationship and the element in the second relationship are the same. Each of the first and second relationships is, for example, a curve representing a change in the element with a change in the weaving position in the present embodiment. Any one element of the three electrical first to third elements related to Ohm's law (welding current, welding voltage, or welding resistance) is, for example, a welding resistance in the present embodiment, and the first relationship is, for example, each of five, zeroth to fourth, curves CV0 to CV4 that are shown in FIG. 3 and obtained for five deviation amounts of 0 to 4 [mm], respectively. The zeroth curve CV0 is a curve representing a change in a welding resistance with a change in a weaving position in a case of the deviation amount of 0 [mm]. The first curve CV1 is a curve representing a change in a welding resistance with a change in a weaving position in a case of the deviation amount of 1 [mm]. The second curve CV2 is a curve representing a change in a welding resistance with a change in a weaving position in a case of the deviation amount of 2 [mm]. The third curve CV3 is a curve representing a change in a welding resistance with a change in a weaving position in a case of the deviation amount of 3 [mm]. The fourth curve CV4 is a curve representing a change in a welding resistance with a change in a weaving position in a case of the deviation amount of 4 [mm]. In the first relationship information storage unit 61, for example, zeroth to fourth functions (function formulas) respectively representing the zeroth to fourth curves CV0 to CV4 are stored as the first relationship in association with the deviation amounts of 0 to 4 [mm], respectively. Alternatively, in the first relationship information storage unit 61, for example, for each of the zeroth to fourth curves CV0 to CV4, weaving positions at predetermined intervals and welding resistances corresponding to the weaving positions are stored in a table form (tabular form) as the first relationship.

The zeroth to fourth curves CV0 to CV4 are obtained for the five deviation amounts of 0 to 4 [mm], respectively, based on the physical model of the arc welding phenomenon in a following manner (a first relationship calculation step), and are stored in advance in the first relationship information storage unit 61 (a storing step).

Figure 4:
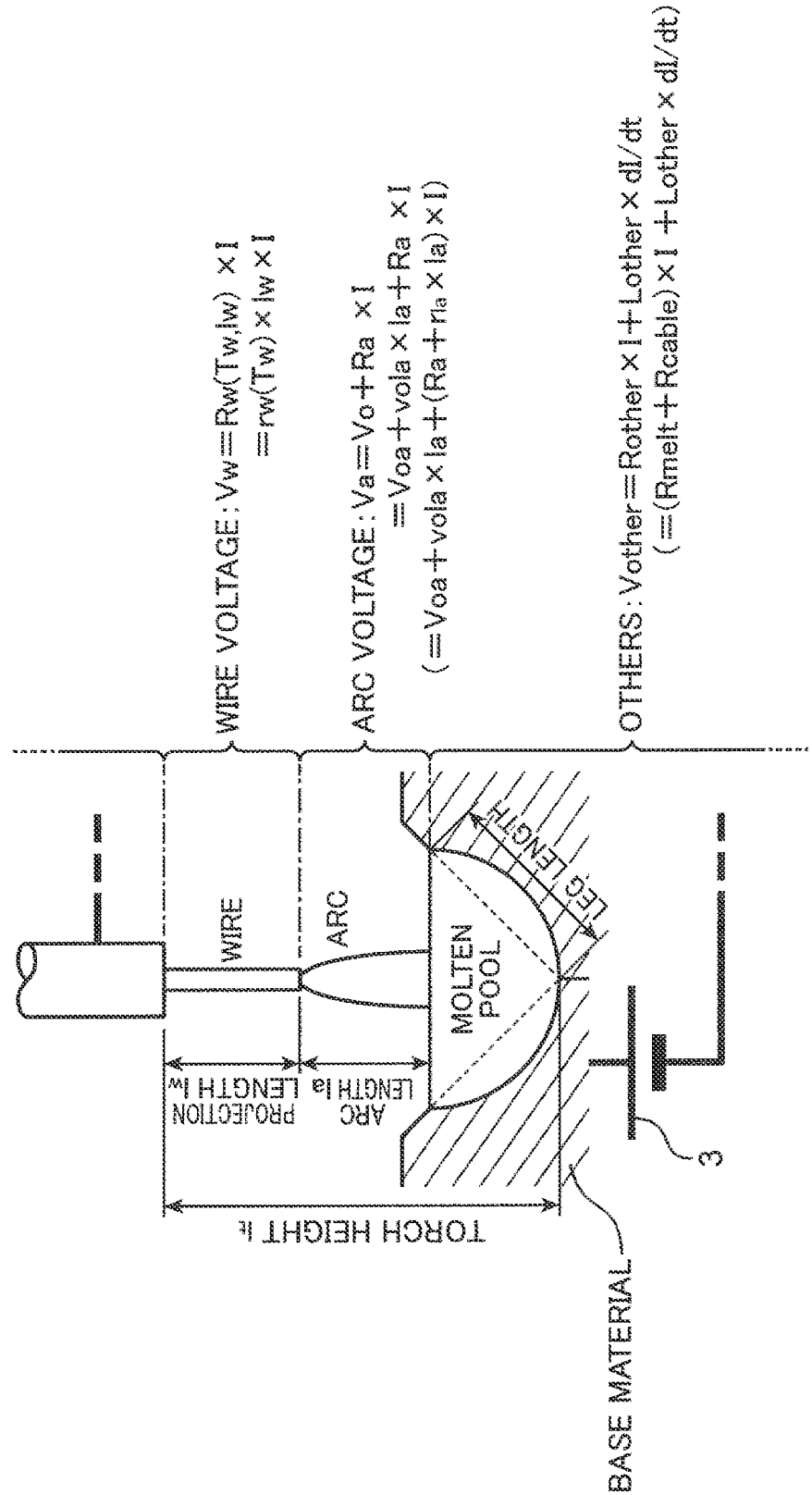
FIG. 4 is a view for explaining a voltage during welding.
Figure 5:
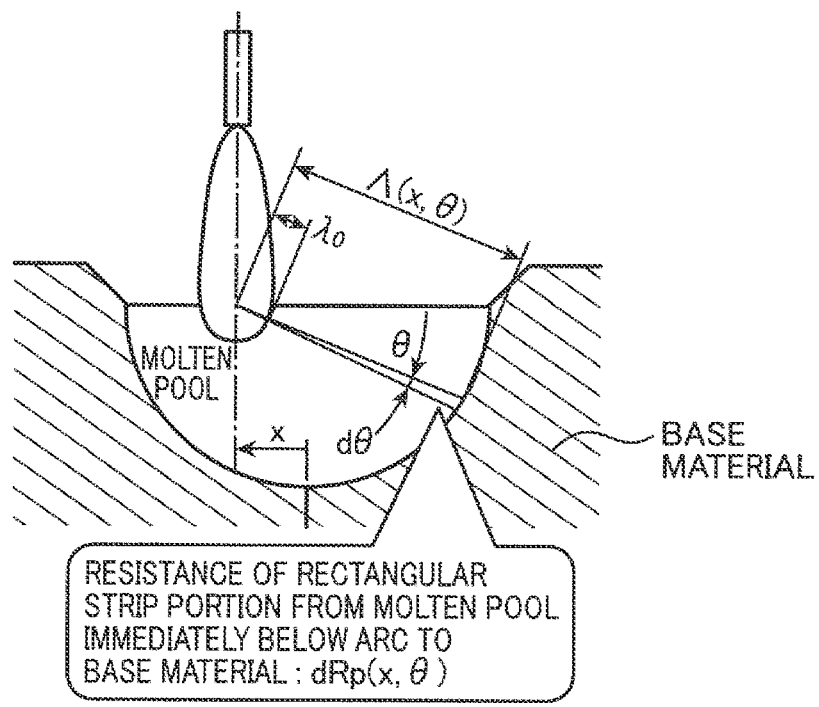
FIG. 5 is a view for explaining a resistance calculation model for a molten pool.
Figure 6:
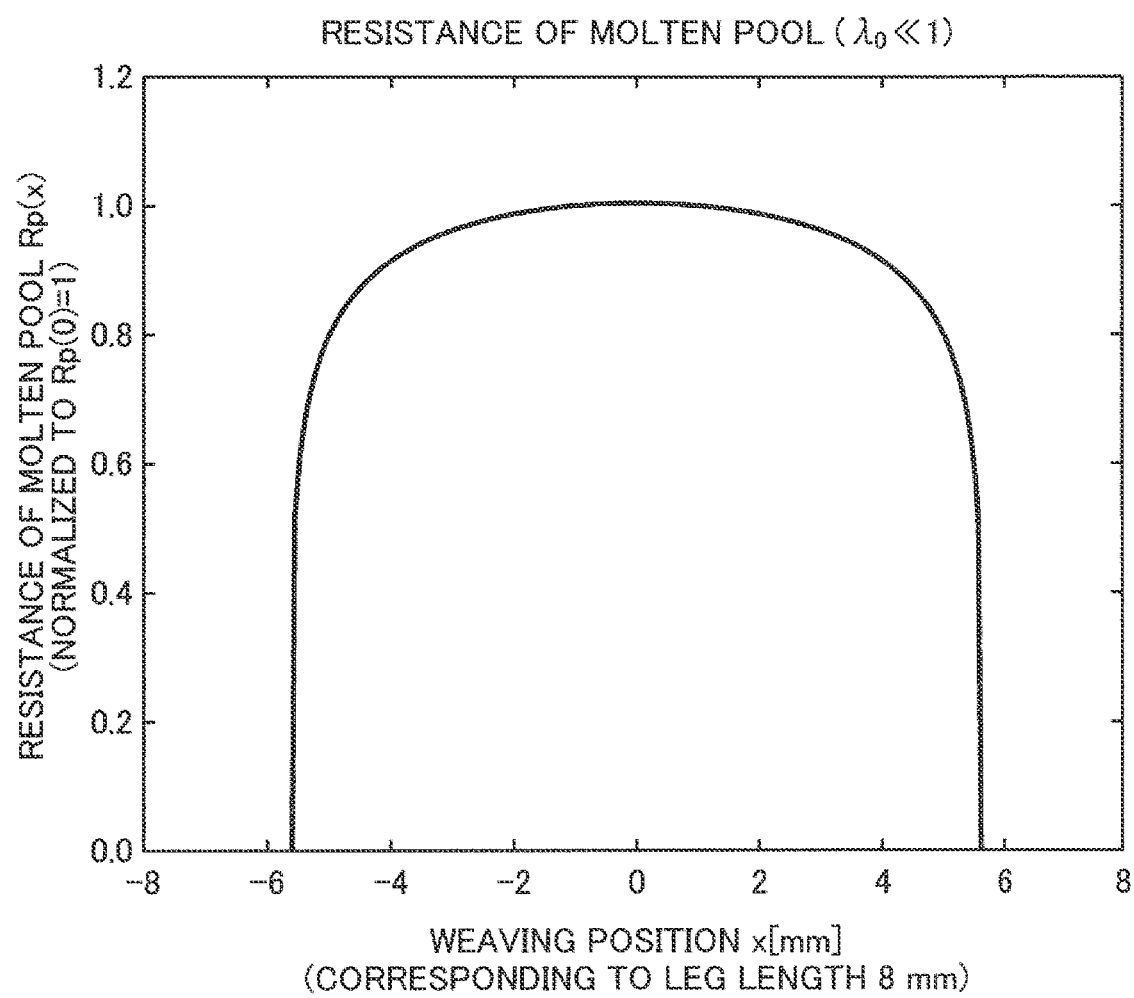
FIG. 6 is a diagram showing a calculation result of a resistance component of the molten pool.
Figure 7:
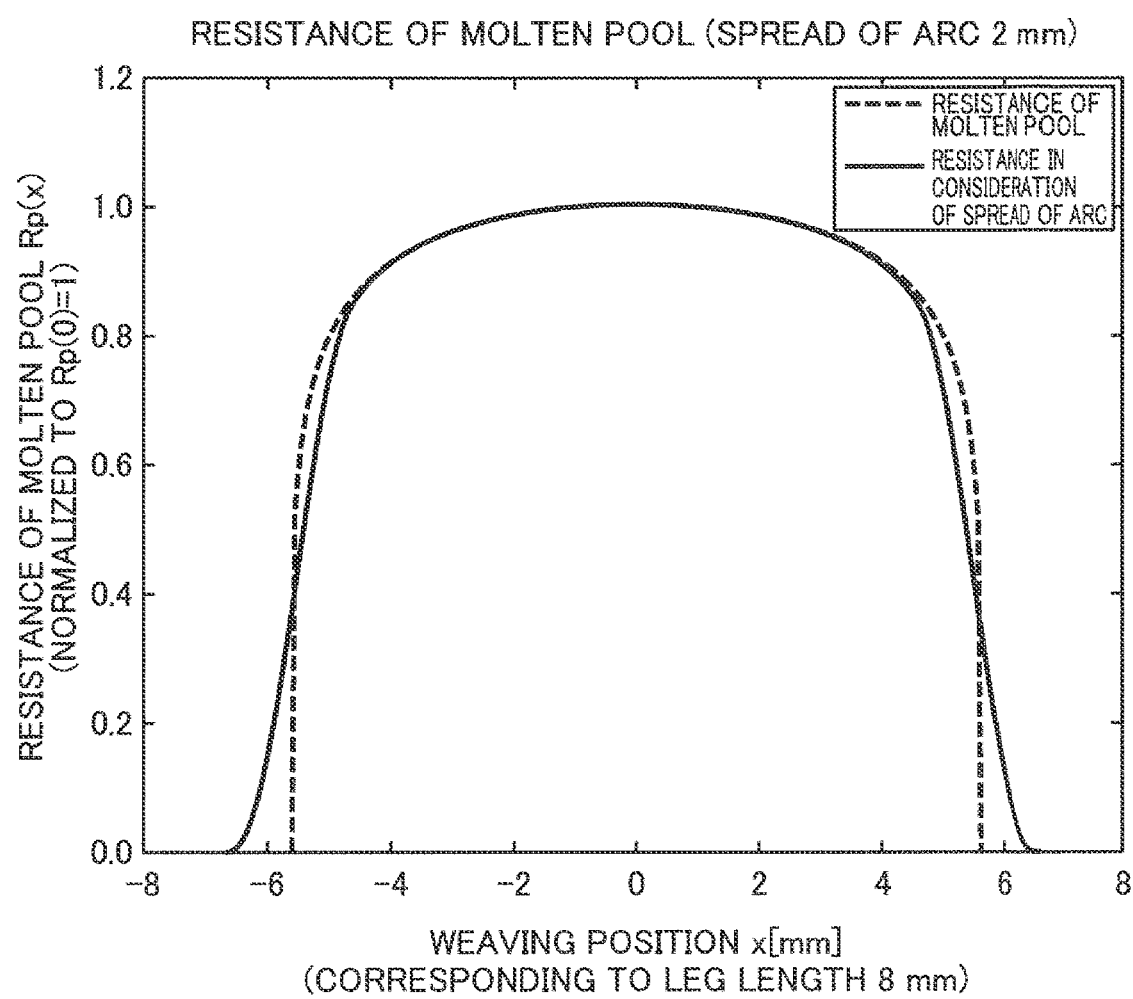
FIG. 7 is a diagram showing a calculation result of the resistance component of the molten pool in consideration of a spread of an arc.

FIG. 4 is a view for explaining a voltage during welding. FIG. 5 is a view for explaining a resistance calculation model of a molten pool. FIG. 6 is a diagram showing a calculation result of a resistance component of the molten pool. FIG. 7 is a diagram showing a calculation result of the resistance component of the molten pool in consideration of a spread of an arc. FIG. 7 also shows the calculation result indicated by a broken line in FIG. 6. In FIG. 6 and FIG. 7, the horizontal axis represents a weaving position, and the vertical axis represents a resistance value of the molten pool (welding pool) when normalized to $R_p(0)=1$. FIG. 8 is a view for explaining a state of the molten pool during weaving. FIG. 9 is a diagram showing a welding resistance with respect to a weaving position identified by actual measurement. In FIG. 9, the horizontal axis represents a weaving position [mm], and the vertical axis represents a resistance [n].

As illustrated in FIG. 4, the voltage V of the power source 3 during welding is expressed by the following Formulas 1a to 1d.

$$V = V_a + V_w + V_{other} \quad \text{Formula 1a;}$$

$$V_a = (V_{oa} + v_{ola} \cdot l_a) + R_a \cdot I \quad \text{Formula 1b;}$$

$$V_w = R_w(l_w, T_w) \approx r_w(T_w) \cdot l_w \cdot I \quad \text{Formula 1c;}$$

$$V_{other} = R_{other} \cdot I + L_{other} \cdot (dI/dt) \quad \text{Formula 1d;}$$

Here, $V_a$ is a voltage (arc voltage) of an arc portion, $V_w$ is a voltage (wire voltage) of the welding wire, and $V_{other}$ is a voltage of other portion such as a molten pool or a cable (voltage of other portion except the arc portion and the welding wire). $V_{oa}$ is a constant term of an offset voltage in the arc portion, $v_{ola}$ is a proportional term proportional to an arc length $l_a$ of the offset voltage in the arc portion, and $R_a$ is a resistance value of a resistance component (arc resistance) in the arc portion. $R_w(l_w, T_w)$ is a resistance value of a resistance component (wire resistance) in a case of a projection length $l_w$ and a wire average temperature $T_w$ in the welding wire, and is calculated as (resistance value $r_w(T_w)$ per unit length in a case of the wire average temperature $T_w$))×(projection length $l_w$) assuming that the wire resistance is proportional to the temperature. $R_{other}$ is a resistance value of a resistance component (residual resistance) of the other portion (a resistance value of the other portion expecting the arc portion and the welding wire), and $L_{other}$ is an inductance of the other portion (an inductance of the other portion except the arc portion and the welding wire).

Therefore, the welding resistance R is expressed by the following Formula 2.

$$R = R_a + r_w(T_w) \cdot l_w + R_{other} \quad \text{Formula 2;}$$

Although the arc resistance varies with a type of shielding gas or the like, conversely, when the shielding gas is determined, a resistance value of the arc resistance is obtained.

The wire resistance is determined by a diameter (wire diameter) and the projection length $l_w$ of the welding wire. The wire diameter can be actually measured when the welding wire is determined. In general, an arc portion is said to have a constant length (arc length), and as can be seen from FIG. 4, the projection length $l_w$ can be calculated from a torch height $l_t$, the arc length $l_a$, and a liquid level position of the molten pool. The liquid level position of the molten pool can be calculated from a cross-sectional area of the molten pool, and the cross-sectional area of the molten pool can be calculated from a wire supply speed and a welding speed, or a welding amount and the welding speed. As illustrated in FIG. 6 to be described later, in a case where the arc largely deviates from the welding line and the arc is irradiated (formed) on a base material surface outside the molten pool, a base material surface position is used instead of the liquid level position of the molten pool.

The residual resistance can be divided into a resistance component and a constant component of the molten pool. The constant component (=(residual resistance)−(resistance component of the molten pool)) can be actually measured as a short-circuit resistance, for example, in so-called touch sensing or the like in which a base material is searched for by touching the base material with a welding wire.

Assuming that the molten pool is formed to have a semicircular shape as illustrated in FIG. 5, a resistance component $R_p(x)$ of the molten pool from immediately below the arc to the base material is expressed by the following Formula 3.

$$R_p(x) = 1 \Big/ \int (1/dR_p(x,\theta))d\theta \quad ; \quad \text{Formula 3}$$
$$= 1 \Big/ \int \Big\{ 1 \Big/ \int (\rho/\lambda)d\lambda \Big\} d\theta$$

where x represents a weaving position. $\lambda$ represents a distance from an origin in a direction of a molten pool outer peripheral surface in the molten pool in a case where an intersection between a molten pool surface and a center line of the arc is set to the origin. $\theta$ represents an angle in a circumferential direction from the origin in the molten pool. $\rho$ represents an electric resistance coefficient [Ω·m/m$^2$] of the molten pool, and a depth direction of the sheet is ignored. $\lambda_O$ represents a distance from the origin to an arc surface in the direction of the molten pool outer peripheral surface. $\Lambda(x,\theta)$ represents a distance from the arc surface to the molten pool outer peripheral surface in the direction of the molten pool outer peripheral surface at $(x,\theta)$. The inner integral for $d\lambda$ in Formula 3 is an integral from $\lambda_O$ to $\Lambda(x,\theta)$, and the outer integral for $d\theta$ in Formula 3 is an integral from 0 to $\pi$ since the molten pool is assumed to be semicircular.

Since the electric resistance coefficient $\rho$ of the molten pool is unknown, there is shown in FIG. 6 a calculation result of x and $R_p(x)$ in a case where $R_p(x)$ at the weaving center (x=0) is normalized to 1 (a value of p is assumed) and $\lambda_O$ is minute ($\lambda_O$ to <<0). Then, in order to take into account the arc spread ($\lambda_O \neq 0$), there is shown in FIG. 7 a calculation result obtained by smoothing a range of the arc spread with a radius-weighted moving average filter ($\lambda_O \neq =2$ [mm]). Thus, the resistance component of the molten pool can be calculated.

Figure 8A:
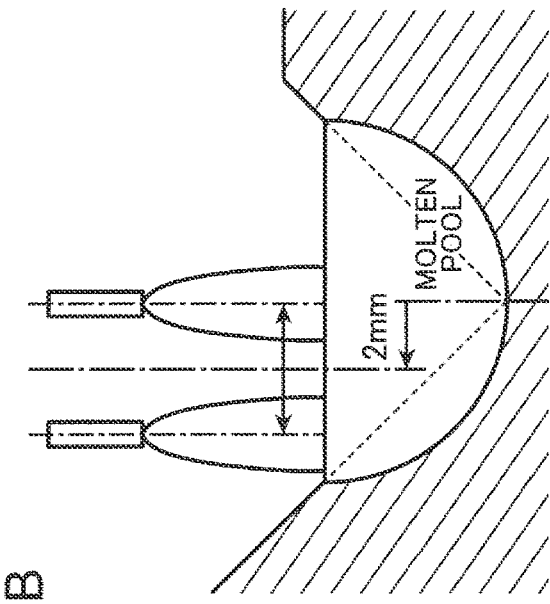
FIGS. 8A to 8D are views for explaining a state of the molten pool during weaving.
Figure 8B:
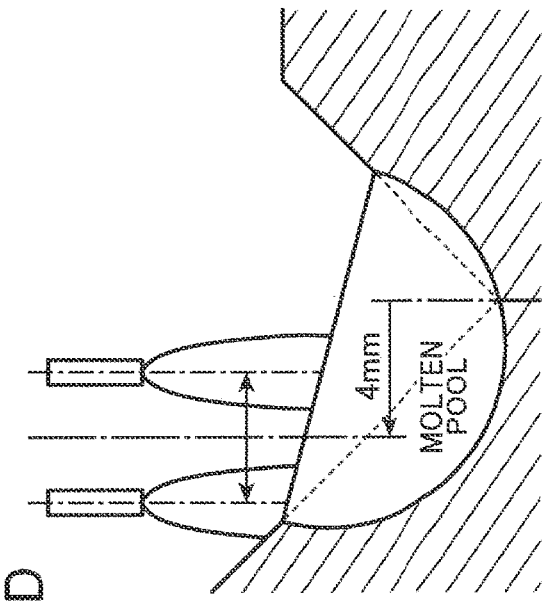

A state of the molten pool during weaving can be assumed as follows. For example, as illustrated in FIG. 8A and FIG. 8B, the state of the molten pool does not change while the arc moves on the molten pool during weaving, and a molten pool having a leg length of, for example, 8 [mm] is formed. The resistance component of the molten pool in this case is as shown in FIG. 6 and FIG. 7 described above. Here, the leg length is generally a distance from a root (root portion) of a joint to a weld end (intersection between the base material surface and a weld bead surface) as shown in FIG. 4.

Figure 8C:
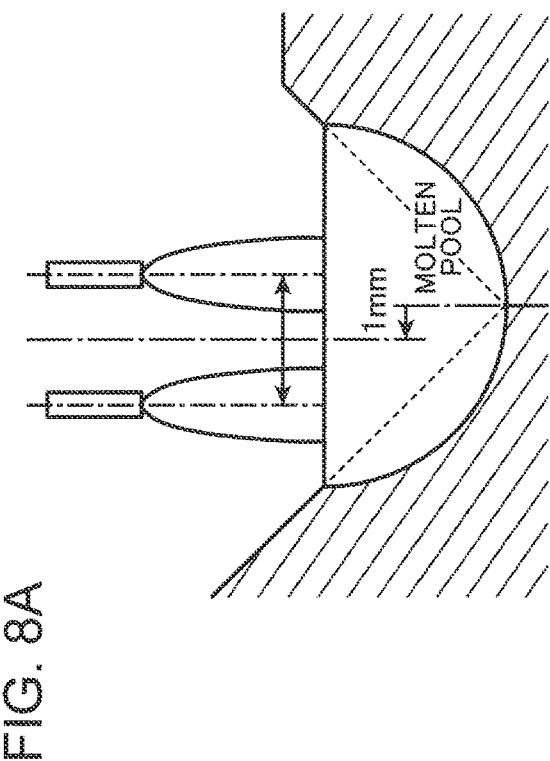
Figure 8D:
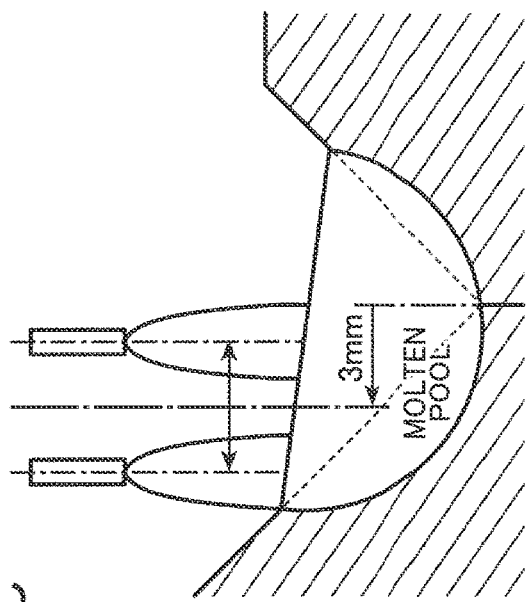

By contrast, as illustrated in FIG. 8C, at the deviation of 3 [mm] where the arc slightly protrudes from the molten pool having a leg length of 8 [mm] during weaving, the base material directly hit by the arc is melted, and a slightly inclined molten pool is formed as illustrated in the drawing. The size of the molten pool is determined by the melted base material and a welding amount of a solvent. A melting amount of the base material is increased by an amount of direct contact of the arc, and the size of the molten pool is accordingly increased slightly. Then, as illustrated in FIG. 8D, at the deviation of 4 [mm] further greatly deviating from the molten pool having the leg length of 8 [mm], a molten region of the base material is shifted to the left in the drawing, and the inclination of the molten pool is increased. Therefore, the molten pool is not shifted to the left so much as expected, so that the molten pool is formed without spreading to a base material region directly hit by the arc. In the cases illustrated in FIG. 8C and FIG. 8D, assuming that the molten pool is formed obliquely, a resistance component of the molten pool can be calculated similarly to the above case illustrated in FIG. 8A and FIG. 8B.

The zeroth to fourth curves CV0 to CV4 were obtained based on the physical model of such an arc welding phenomenon. In the example illustrated in FIG. 3, the arc resistance is set to 0.111Ω, the wire resistance is set to 0.069Ω, and the constant component of the residual resistance is set to 0.0022Ω. The shielding gas is a mixed gas of argon (Ar) and carbon dioxide ($CO_2$).

When FIG. 9 showing the identification result obtained by actual measurement is compared with FIG. 3, the calculation result of FIG. 3 well simulates the identification result of FIG. 9.

Returning to FIG. 1, the control processing unit 5 is a circuit for controlling the respective units 1 to 4 and 6 to 9 of the welding device D in accordance with the functions of the respective units, and correcting a deviation amount between the weaving center and the welding line to perform arc-tracking welding. The control processing unit 5 includes, for example, a central processing unit (CPU) and its peripheral circuits. In the control processing unit 5, a control unit 51, a second relationship actual measurement unit 52, and a deviation amount calculation unit 53 are functionally configured by the execution of the control processing program.

The control unit 51 controls the respective units 1 to 4 and 6 to 9 of the welding device D in accordance with the functions of the respective units, and is in charge of entire control of the welding device D.

The second relationship actual measurement unit 52 obtains a second relationship between a weaving position and the element based on the element in welding power to be supplied to the welding wire, the element being measured by the measurement unit 4. More specifically, in the present embodiment, the element is a welding resistance, and the second relationship actual measurement unit 52 obtains a welding resistance based on a welding voltage, a welding current, and the high frequency component in welding power to be supplied to the welding wire, which are measured by the measurement unit 4, and obtains a second relationship between a weaving position and the welding resistance.

The deviation amount calculation unit 53 obtains a deviation amount between a weaving center and a welding line based on the first relationship stored in the first relationship information storage unit 61 and the second relationship obtained by the second relationship actual measurement unit 52. More specifically, in the present embodiment, the deviation amount calculation unit 53 obtains a correlation between each of the five zeroth to fourth curves CV0 to CV4 as the first relationship and a curve of the second relationship obtained by the second relationship actual measurement unit 52, the five zeroth to fourth curves being stored in the first relationship information storage unit 61 in association with the five deviation amounts, respectively, selects a curve most correlated with the curve of the second relationship obtained by the second relationship actual measurement unit 52 from among the zeroth to fourth curves CV0 to CV4, and obtains a deviation amount associated with the selected curve. In the zeroth to fourth CV0 to CV4, the deviation amount is obtained at an interval of 1 [mm]. However, in a case where significant correlation values with respect to two curves adjacent to each other in a deviation amount are obtained, the deviation amount may be obtained on the order of sub-millimeter by proportionally dividing an amount between one deviation amount associated with one curve out of the curves adjacent to each other in a deviation amount and the other deviation amount associated with the other curve by a ratio of the correlation value of the one curve and the correlation value of the other curve. For example, in a case where the correlation value of the first curve CV1 is 0.4 and the correlation value of the second curve CV2 is 0.6, the curve of the second relationship is more correlated with the second curve CV2, and the deviation amount is 1.6.

The control unit 51 then controls the moving mechanism unit 2 such that the welding torch performs arc welding along the welding line based on the deviation amount obtained by the deviation amount calculation unit 53. A known conventional means is used to control the arc-tracking welding, and at the use, in the present embodiment, the correction is performed with the deviation amount obtained by the deviation amount calculation unit 53.

The control processing unit 5, the storage unit 6, the input unit 7, the display unit 8, and the IF unit 9 can be configured by, for example, a computer such as a desktop computer or a notebook computer.

Next, operation of the present embodiment will be described. FIG. 10 is a flowchart showing operation of the welding device.

When the welding device D having such a configuration is powered on, the welding device D initializes necessary units and starts operating the units. In the control processing unit 5, the control unit 51, the second relationship actual measurement unit 52, and the deviation amount calculation unit 53 are functionally configured by the execution of the control processing program.

When arc welding is performed tracking a welding line while performing weaving operation, first, the welding device D measures, by the measurement unit 4, the element in welding power to be supplied to the welding wire (S1).

Next, by the second relationship actual measurement unit 52 of the control processing unit 5, the welding device D obtains a second relationship between a weaving position and the element based on the element in the welding power to be supplied to the welding wire, the element being measured by the measurement unit 4 (S2, a second relationship actual measurement step). In the present embodiment, a welding resistance is obtained based on a welding voltage, a welding current, and the high frequency component in the welding power to be supplied to the welding wire, which are measured by the measurement unit 4, and a second relationship between a weaving position and the welding resistance is obtained.

Next, in the welding device D, the deviation amount calculation unit 53 of the control processing unit 5 obtains a deviation amount between a weaving center and a welding line based on the first relationship stored in the first relationship information storage unit 61 and the second relationship obtained by the second relationship actual measurement unit 52 (S3: a deviation amount calculation step).

Then, in the welding device D, the control unit 51 of the control processing unit 5 controls the moving mechanism unit 2 such that the welding torch performs arc welding along the welding line based on the deviation amount obtained by the deviation amount calculation unit 53 (S4).

Each of such processing is repeatedly executed during arc-tracking welding to perform welding.

As described above, since in the welding device D according to the embodiment and the arc-tracking welding method mounted on the welding device D, a relationship between the weaving position and any one element (welding resistance, welding voltage, or welding current) of three electrical first to third elements related to Ohm's law is used instead of using a difference in current values, resistance values, or the like between a left end position and a right end position of weaving as used in conventional art, more accurate tracking control can be realized.

According to the present embodiment, it is possible to provide the welding device D and the arc-tracking welding method which enable more accurate tracking control using a welding resistance to be realized. In particular, in a case where the welding resistance includes a resistance component of a molten pool, the welding device D and the arc-tracking welding method can realize more accurate tracking control by considering the resistance component of the molten pool.

Although in the above embodiment, the element is a welding resistance, the element may be a welding current or a welding voltage. In a case where the element is a welding current, the first relationship between the weaving position and the welding resistance illustrated in FIG. 3 is rewritten into a first relationship between the weaving position and the welding current according to characteristics of a change in the welding current with a change in the welding resistance in the power source 3, and the rewritten first relationship between the weaving position and the welding current is stored in the first relationship information storage unit 61. Then, the measurement unit 4 measures the welding current, the second relationship actual measurement unit 52 obtains a second relationship between the weaving position and the welding current based on the welding current in the welding power to be supplied to the welding wire, the welding current being measured by the measurement unit 4, and the deviation amount calculation unit 53 obtains a deviation amount based on the first relationship and the second relationship. According to this, it is possible to provide the welding device D and the arc-tracking welding method which enable more accurate tracking control using a welding current to be realized. In a case where the element is a welding voltage, the first relationship between the weaving position and the welding resistance illustrated in FIG. 3 is rewritten into the first relationship between the weaving position and the welding voltage according to characteristics of a change in the welding voltage with a change in the welding resistance in the power source 3, and the rewritten first relationship between the weaving position and the welding voltage is stored in the first relationship information storage unit 61. Then, the measurement unit 4 measures the welding voltage, the second relationship actual measurement unit 52 obtains a second relationship between the weaving position and the welding voltage based on the welding voltage in the welding power to be supplied to the welding wire, the welding voltage being measured by the measurement unit 4, and the deviation amount calculation unit 53 obtains a deviation amount based on the first relationship and the second relationship. According to this, it is possible to provide the welding device D and the arc-tracking welding method which enable more accurate tracking control using a welding voltage to be realized.

Although in the above embodiment, each of the first and second relationships is a curve representing a change in the element with a change in the weaving position, each of the first and second relationships may be each value of the element at each of both end positions of the weaving or a difference between the values. In such a welding device D and an arc-tracking welding method, since each of the first and second relationships is each of the respective values or a difference between the respective values, a deviation amount can be obtained by simple processing (simple comparison). More specifically, for example, as illustrated in FIG. 3, values of welding resistances are stored as the first relationship in the first relationship information storage unit 61 in association with the five deviation amounts of 0 to 4 [mm], respectively, the values of welding resistances being values of welding resistances respectively corresponding to both end positions PT01 and PT02 of weaving in the zeroth curve CV0, values of welding resistances respectively corresponding to both end positions PT11 and PT12 of weaving in the first curve CV1, values of welding resistances respectively corresponding to both end positions PT21 and PT22 of weaving in the second curve CV2, values of welding resistances respectively corresponding to both end positions PT31 and PT32 of weaving in the third curve CV3, and values of welding resistances respectively corresponding to both end positions PT41 and PT42 of weaving in the fourth curve CV4. Alternatively, for example, as illustrated in FIG. 3, differences between values of welding resistances are stored as the first relationship in the first relationship information storage unit 61 in association with the five deviation amounts of 0 to 4 [mm], respectively, the difference between values of welding resistances being a difference (zeroth difference) between values of welding resistances respectively corresponding to both end positions PT01 and PT02 of weaving in the zeroth curve CV0, a difference (first difference) between values of welding resistances respectively corresponding to both end positions PT11 and PT12 of weaving in the first curve CV1, a difference (second difference) between values of welding resistances respectively corresponding to both end positions PT21 and PT22 of weaving in the second curve CV2, a difference (third difference) between values of welding resistances respectively corresponding to both end positions PT31 and PT32 of weaving in the third curve CV3, and a difference (fourth difference) between values of welding resistances respectively corresponding to both end positions PT41 and PT42 of weaving in the fourth curve CV4.

Additionally, although in the above embodiment, the first relationship is stored in the first relationship information storage unit 61 in association with the deviation amount, a mathematical formula representing the first relationship may be stored in the storage unit 6, and a deviation amount may be obtained by obtaining a first relationship most correlated with the second relationship while operating the deviation amount.

The present specification discloses the techniques according to the various aspects as described above, of which main techniques will be summarized below.

An arc-tracking welding method according to one aspect is an arc-tracking welding method in a consumable electrode type welding device having a weaving function for swinging a torch in a direction crossing a welding direction, the arc-tracking welding method including: a first relationship calculation step of obtaining, based on a physical model of an arc welding phenomenon, a first relationship between a weaving position and any one element of three electrical first to third elements related to Ohm's law in association with a deviation amount between a weaving center and a welding line; a second relationship actual measurement step of obtaining a second relationship between the weaving position and the element based on the element in welding power to be supplied to the consumable electrode; and a deviation amount calculation step of obtaining the deviation amount between the weaving center and the welding line based on the first relationship obtained in the first relationship calculation step and the second relationship obtained in the second relationship actual measurement step. Preferably, the arc-tracking welding method in the consumable electrode type welding device having a weaving function of swinging a torch in a direction crossing a welding direction includes: a storing step of storing, in a storage unit and in association with a deviation amount between a weaving center and a welding line, a first relationship between a weaving position and any one element of three electrical first to third elements related to Ohm's law, the first relationship being obtained based on a physical model of an arc welding phenomenon; a second relationship actual measurement step of obtaining a second relationship between the weaving position and the element based on the element in welding power to be supplied to the consumable electrode; and a deviation amount calculation step of obtaining the deviation amount based on the first relationship stored in the storage unit and the second relationship obtained in the second relationship actual measurement step.

Unlike a conventional method which uses a difference in current values, resistance values or the like between a left end position and a right end position of weaving, since such an arc-tracking welding method uses a relationship between the weaving position and any one element (welding resistance, welding voltage, or welding current) of the three electrical first to third elements related to Ohm's law, more accurate tracking control can be realized.

According to another aspect, in the arc-tracking welding method described above, the element is a welding resistance, and the second relationship actual measurement step includes obtaining the second relationship based on a high frequency component superimposed on a welding current of the welding power to be supplied to the consumable electrode. Preferably, in the arc-tracking welding method, the welding resistance includes a resistance component of a molten pool.

According to this, it is possible to provide an arc-tracking welding method which enables more accurate tracking control using a welding resistance to be realized. In particular, in a case where the welding resistance includes a resistance component of the molten pool, the arc-tracking welding method can realize more accurate tracking control by considering the resistance component of the molten pool.

According to a still another aspect, in the arc-tracking welding method described above, the element is a welding voltage.

According to this, it is possible to provide an arc-tracking welding method which enables more accurate tracking control using a welding voltage to be realized.

According to a still another aspect, in the arc-tracking welding method described above, the element is a welding current.

According to this, it is possible to provide an arc-tracking welding method which enables more accurate tracking control using a welding current to be realized.

According to a still another aspect, in the arc-tracking welding methods described above, each of the first and second relationships is a curve representing a change in the element with a change in the weaving position. Preferably, in the arc-tracking welding method described above, the deviation amount calculation step includes obtaining a first relationship most correlated with the second relationship, and obtaining a deviation amount represented by the obtained first relationship as a deviation amount between the weaving center and the welding line.

In such an arc-tracking welding method, since the first and second relationships are the curves, a deviation amount can be obtained in consideration of each value of the element at each weaving position during weaving.

According to a still another aspect, in the arc-tracking welding methods described above, each of the first and second relationships is each value of the element at each of both end positions of the weaving or a difference between the values.

In such an arc-tracking welding method, since each of the first and second relationships is each of the respective values or a difference between the respective values, a deviation amount can be obtained by simple processing (simple comparison).

A welding device according to a still another aspect is a consumable electrode type welding device having a weaving function of swinging a torch in a direction crossing a welding direction, the welding device including: a first relationship information storage unit that stores, in association with a deviation amount between a weaving center and a welding line, a first relationship between a weaving position and any one element of three electrical first to third elements related to Ohm's law, the first relationship being obtained based on a physical model of an arc welding phenomenon; a second relationship actual measurement unit that obtains a second relationship between the weaving position and the element based on the element in welding power to be supplied to the consumable electrode; a deviation amount calculation unit that obtains a deviation amount between the weaving center and the welding line based on the first relationship stored in the first relationship information storage unit and the second relationship obtained by the second relationship actual measurement unit; a moving mechanism unit that moves the torch; and a control unit that controls the moving mechanism unit such that the torch performs arc welding tracking along the welding line based on the deviation amount obtained by the deviation amount calculation unit.

Unlike a conventional device which uses a difference in current values, resistance values or the like between a left end position and a right end position of weaving, since such a welding device uses a relationship between the weaving position and any one element (welding resistance, welding voltage, or welding current) of the three electrical first to third elements related to Ohm's law, more accurate tracking control can be realized.

This application is based on Japanese Patent Application No. 2020-171920 filed on Oct. 12, 2020, the contents of which are included in the present application.

Although the present invention has been appropriately and sufficiently described above through the embodiments with reference to the drawings in order to express the present invention, it should be recognized that a person skilled in the art can easily modify and/or improve the above-described embodiments. Therefore, unless a change or improvement made by a person skilled in the art is at a level that departs from the scope of the claims described in the claims, the change or improvement is interpreted to be included in the scope of the claims.

The invention claimed is:

1. An arc-tracking welding method in a consumable electrode type welding device having a weaving function for swinging a torch in a direction crossing a welding direction, the arc-tracking welding method comprising:
   a first relationship calculation step of obtaining, based on a physical model of an arc welding phenomenon, a first relationship between a weaving position and any one element of three electrical first to third elements related to Ohm's law in association with a deviation amount between a weaving center and a welding line;
   a second relationship actual measurement step of obtaining a second relationship between the weaving position and the element based on the element in welding power to be supplied to the consumable electrode; and
   a deviation amount calculation step of obtaining the deviation amount based on the first relationship obtained in the first relationship calculation step and the second relationship obtained in the second relationship actual measurement step,
   wherein the first relationship is rewritten from a relationship between the weaving position and a welding resistance into a relationship between the weaving position and a welding current, or is rewritten from the relationship between the weaving position and the welding resistance into a relationship between the weaving position and a welding voltage, and
   the deviation amount calculation step includes obtaining the deviation amount based on the rewritten first relationship.

2. The arc-tracking welding method according to claim 1, wherein the second relationship actual measurement step includes obtaining the second relationship based on a high frequency component superimposed on the welding current of the welding power to be supplied to the consumable electrode.

3. The arc-tracking welding method according to claim 1, wherein each of the first and second relationships is a curve representing a change in the element with a change in the weaving position.

4. The arc-tracking welding method according to claim 1, wherein each of the first and second relationships is one of each value of the element at each of both end positions of the weaving and a difference between the values.

5. A consumable electrode type welding device having a weaving function of swinging a torch in a direction crossing a welding direction, the welding device comprising:
   a moving mechanism unit that moves the torch;
   a memory configured to store, in association with a deviation amount between a weaving center and a welding line, a first relationship between a weaving position and any one element of three electrical first to third elements related to Ohm's law, the first relationship being obtained based on a physical model of an arc welding phenomenon; and
   a processor configured to function as:
      a second relationship actual measurement unit that obtains a second relationship between the weaving position and the element based on the element in welding power to be supplied to the consumable electrode;
      a deviation amount calculation unit that obtains the deviation amount based on the first relationship stored in the memory and the second relationship obtained by the second relationship actual measurement unit; and
      a control unit that controls the moving mechanism unit such that the torch performs arc welding tracking along the welding line based on the deviation amount obtained by the deviation amount calculation unit,
   wherein the control unit is configured to rewrite the first relationship from a relationship between the weaving position and a welding resistance into a relationship between the weaving position and a welding current, or rewrite the first relationship from the relationship between the weaving position and the welding resistance into a relationship between the weaving position and a welding voltage, and
   the deviation amount calculation unit is configured to obtain the deviation amount based on the rewritten first relationship.

* * * * *